(12) United States Patent
Nemer et al.

(10) Patent No.: US 7,333,558 B2
(45) Date of Patent: Feb. 19, 2008

(54) DIGITALLY PRE-EQUALIZING SIGNALS

(75) Inventors: Elias J. Nemer, San Jose, CA (US); Vladimir Kravtsov, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 873 days.

(21) Appl. No.: 10/403,576

(22) Filed: Mar. 31, 2003

(65) Prior Publication Data

US 2004/0190644 A1 Sep. 30, 2004

(51) Int. Cl.
*H04L 27/04* (2006.01)
(52) U.S. Cl. ..................................... 375/296
(58) Field of Classification Search ............... 375/296, 375/295, 284, 285, 278; 348/608, 723; 332/159; 455/278.1, 295
See application file for complete search history.

(56) References Cited

U.S. PATENT DOCUMENTS

| | | | | |
|---|---|---|---|---|
| 6,519,010 | B2* | 2/2003 | Twitchell et al. | 348/608 |
| 6,661,849 | B1* | 12/2003 | Guo et al. | 375/261 |
| 6,907,065 | B2* | 6/2005 | Kim | 375/233 |
| 6,957,044 | B2* | 10/2005 | Beech et al. | 455/13.4 |
| 6,968,170 | B2* | 11/2005 | Talbot | 455/278.1 |
| 2003/0179831 | A1* | 9/2003 | Gupta et al. | 375/296 |

OTHER PUBLICATIONS

STEL-1109/CR 5-65 MHz Burst Transmitter Preliminary Product Information. Intel Corporation, Dec. 15, 1999.

\* cited by examiner

*Primary Examiner*—Khai Tran
(74) *Attorney, Agent, or Firm*—Trop, Pruner & Hu, P.C.

(57) ABSTRACT

In one embodiment, the present invention includes an transmitter apparatus having a digital filter to compensate in a baseband frequency for magnitude and delay slopes occurring in the transmitter's analog path.

21 Claims, 6 Drawing Sheets

Coeff. (0) = 0 − jK
Coeff. (1) = 1 + j0
Coeff. (2) = 0 + jK

DIGITALLY PRE-EQUALIZING SIGNALS

BACKGROUND

The present invention relates to digitally compensating linear distortion in a transmitter (Tx) of a modem and more particularly to digitally compensating linear distortion in a cable modem Tx.

"Modem" stands for modulator/demodulator. Modems may be used to transmit and receive data via telephone lines, cable systems and the like. A cable modem or a similar device may be used to provide high-speed access to the Internet or other computer network. A downstream direction refers to data flow to a cable modem (from a cable head-end or cable modem termination system (CMTS)), and an upstream direction refers to data flow from a cable modem (to a CMTS).

A cable plant provides downstream transmission in the higher frequency range, and upstream transmission in the lower frequency range. Thus higher frequency components of cable modem Tx signals are undesirable and should be minimized, so as not to impair downstream signals. To do so, they are attenuated with a few passive low-pass filters (LPF). But the LPF distorts the signal in the pass-band; also, there are additional sources of linear distortion in the Tx path, namely, a digital-to-analog converter (DAC) and power amplifier. A non-distorting path would have flat frequency response (FR); FR magnitude tilt and FR delay tilt are measures for linear distortion.

Today's requirements on FR cannot be provided with a low-cost LPF. Thus, the equalization (i.e., tilt compensation) problem arises. Presently, an analog equalizer is used to compensate for FR tilt. However, it is not a cost effective solution; the combination of an equalizer and LPF is the same as a high quality LPF. A better LPF requires more accurate components (and more components), raising cost and complexity.

On another hand, a high quality LPF makes more work than needed. The upstream spectrum spans the range of $F_{min}=5$ to $F_{max}=42$ Megahertz (MHz) in cable plants complying with the Data-Over-Cable Service Interface Specifications (DOCSIS), version 2.0, published Dec. 31, 2001, which define interface requirements for cable modems.

A cable modem never uses all of the upstream range at once. The spectrum is divided into a few channels, with the widest one occupying 6.4 MHz; in every given moment the cable modem is programmed to use one of the channels. But a LPF is non-programmable, so its FR must be flat in the whole upstream range.

Thus a need exists to equalize the Tx path "in band" (i.e., in the current channel only), instead of equalizing it in the whole upstream range at once, as a high quality LPF does.

DETAILED DESCRIPTION

In various embodiments, a compensation filter (CF) may be placed in a Tx path of an upstream signal path, such as immediately after a shaping filter (i.e., a Nyquist filter).

Figure 1:
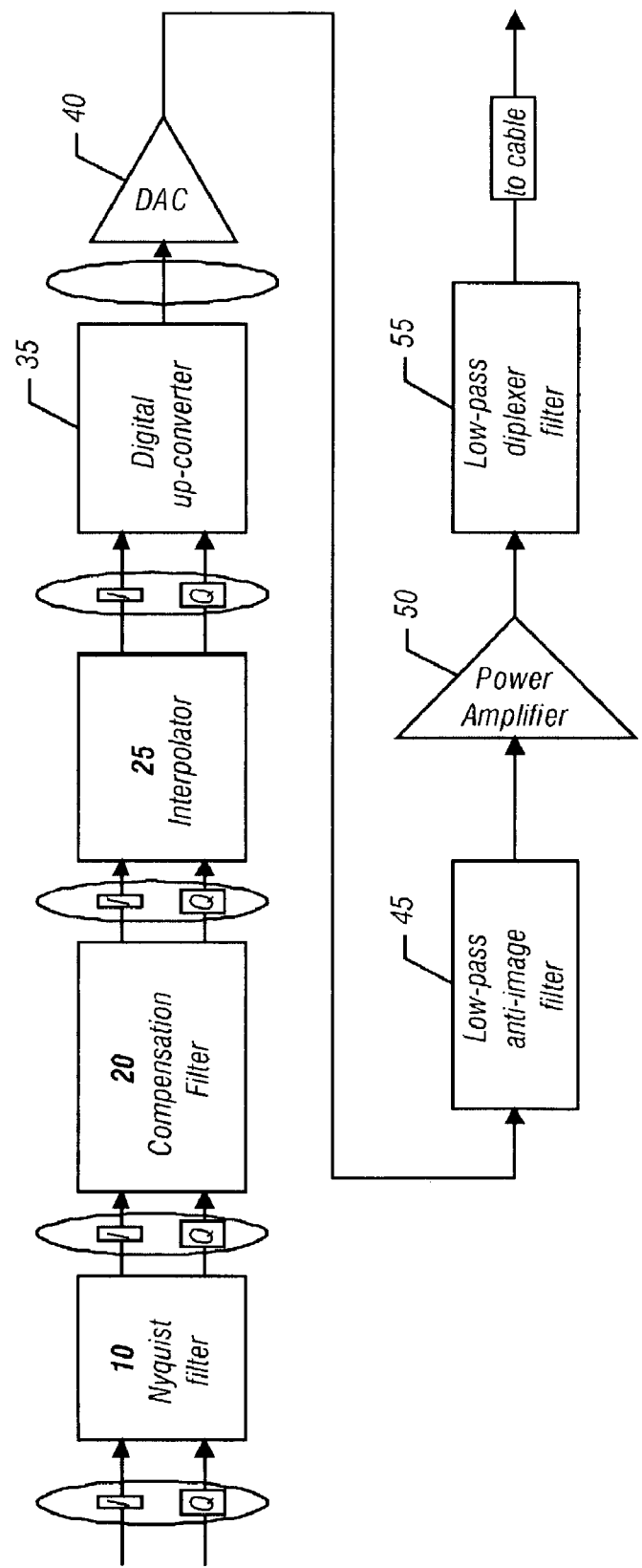
FIG. 1 is a block diagram of a portion of an upstream signal path with a compensation filter in accordance with the present invention.

Referring now to FIG. 1, shown is a block diagram of a portion of an upstream signal path of a cable modem in accordance with one embodiment of the present invention. As shown in FIG. 1, the portion includes Nyquist filter 10, which receives in-phase or real signals (I) and quadrature phase or imaginary signals (Q). In various embodiments, these signals may be provided after data has been encoded into symbols and modulated into a desired modulation scheme. For example, in certain embodiments signals may be provided in biphase shift keying (BPSK) modulation, quadrature phase shift keying (QPSK), or quadrature amplitude modulation (QAM).

The Nyquist filter 10 receives symbols with a symbol rate (SR) and yields intermediate samples. The SR depends on the channel bandwidth; an intermediate sample rate is N-multiple of the symbol rate where N is a constant bigger than 2. In some examples discussed below an intermediate sample rate of 4*SR may be used, that is N=4.

As shown in FIG. 1, I and Q outputs of Nyquist filter 10 are coupled to compensation filter (CF) 20. The I and Q outputs of compensation filter 20 may be coupled to interpolator filter 25. The CF output rate may be equal to its input rate (N*Symbol Rate). The interpolator filter 25 yields samples at DAC rate. The DAC rate is constant, which is independent from SR; in order to represent Tx signal correctly, a DAC rate may be greater than $2*F_{max}$.

As shown in FIG. 1, I and Q outputs of interpolator 25 may be coupled to a digital up-converter 35, which converts a complex baseband signal into a real RF signal with an $F_{carrier}$ centered spectrum. The up-counter 35 output is coupled to a digital-to-analog converter (DAC) 40. DAC 40 converts digital, RF signals into analog signals, which are step-wise varying voltage signals.

As shown in FIG. 1, the DAC 40 output is coupled to a low-pass filter (LPF) 45, which attenuates RF frequency components above $F_{max}$; thus it smoothes the step-wise DAC output. The purpose of this "anti-image" LPF is to attenuate high frequency terms and to mitigate non-linearity in subsequent power amplifier 50. The anti-image LPF output is coupled to power amplifier 50, whose output is coupled to a diplexer LPF 55. The purpose of diplexer LPF 55 is to attenuate in the downstream frequency range noise and non-linear products created by power amplifier 50.

As used herewith, FR denotes the frequency response of the analog path which, in the embodiment of FIG. 1, includes: DAC 40–>LPF 45–>Power Amplifier 50–>Diplexer-LPF 55.

Compensation filter 20 may operate in the baseband (i.e., before modulation) and may correct for subsequent signal distortion in the analog path by providing opposite predistortion. In other words, to compensate for FR tilt around $F_{carrier}$, compensation filter 20 may introduce the opposite tilt.

Figure 2C:
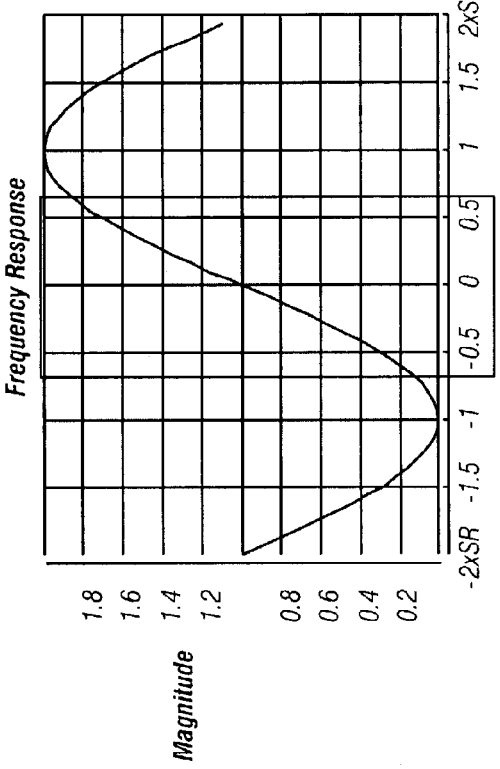
FIG. 2C is a graphical representation of a magnitude frequency response of the digital filter of FIG. 2A.
Figure 2B:
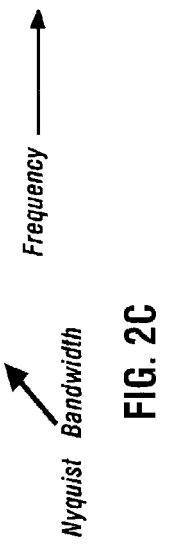
FIG. 2B is an impulse response for the digital filter of FIG. 2A.
Figure 2B:
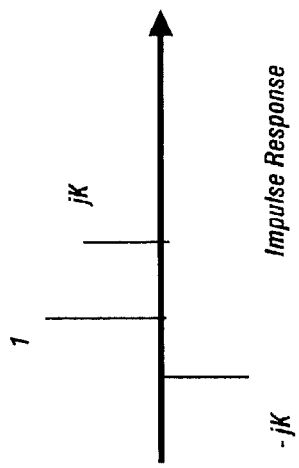
Figure 2A:
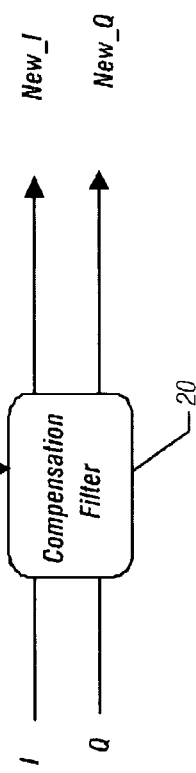
FIG. 2A is a block diagram of a digital filter in accordance with one embodiment of the present invention.

In one embodiment, compensation filter 20 may be a digital filter with 3-taps finite impulse response (FIR), having the middle coefficient equal to 1, and imaginary first and last coefficients. Its structure is shown in FIG. 2A. The impulse response for complex filter 20 of FIG. 2A is shown in FIG. 2B, with the X-axis representing discrete time. In this embodiment, the frequency response may be a sine wave across the complete frequency span, as shown in FIG. 2C.

In one embodiment, the compensation filter 20 frequency response CF(f) may be given by the following equation:

$$CF(f) = 1 + i \cdot (k_+ + k_-) \cdot \cos\left(\frac{2\pi}{N \cdot SR} f\right) + (k_+ - k_-) \cdot \sin\left(\frac{2\pi}{N \cdot SR} f\right) \quad (1)$$

As frequency response FR, carrier frequency $F_{carrier}$, Symbol Rate SR, and Nyquist oversampling rate N are known, the tap coefficients $k_+$ and $k_-$ may be calculated according to the following rule, as analog distortion is a function of the carrier frequency, thus different filter coefficients are generated for different values of the $F_{carrier}$:

Let A be the FR magnitude slope of the analog front end at frequency $F_{carrier}$:

$$M(f) = \frac{d(\text{abs}(FR))}{df}, \quad A = M(F_{carrier}) \quad (2)$$

Similarly, let B be the FR group delay slope at $F_{carrier}$:

$$D(f) = \frac{1}{2\pi} \cdot \frac{d^2(\arg(FR))}{df^2}, \quad B = D(F_{carrier}) \quad (3)$$

Then CF coefficients $k_+$, $k_-$ shall be:

$$k_+ = \frac{N^2 \cdot B \cdot SR^2 - N \cdot A \cdot SR}{4\pi}, \quad k_- = \frac{N^2 \cdot B \cdot SR^2 + N \cdot A \cdot SR}{4\pi} \quad (4)$$

To deduce equation (4) from equation (1), one should calculate CF(f) magnitude and group delay slopes at f=0, then equate them to −A and −B respectively, neglecting powers and products of $k_+$, $k_-$.

In one embodiment, a magnitude-only correction may be needed. In this case $$k_+ = -\frac{N \cdot A \cdot SR}{4\pi} = K, \quad k_- = \frac{N \cdot A \cdot SR}{4\pi} = -K \quad (5)$$

Figure 3:
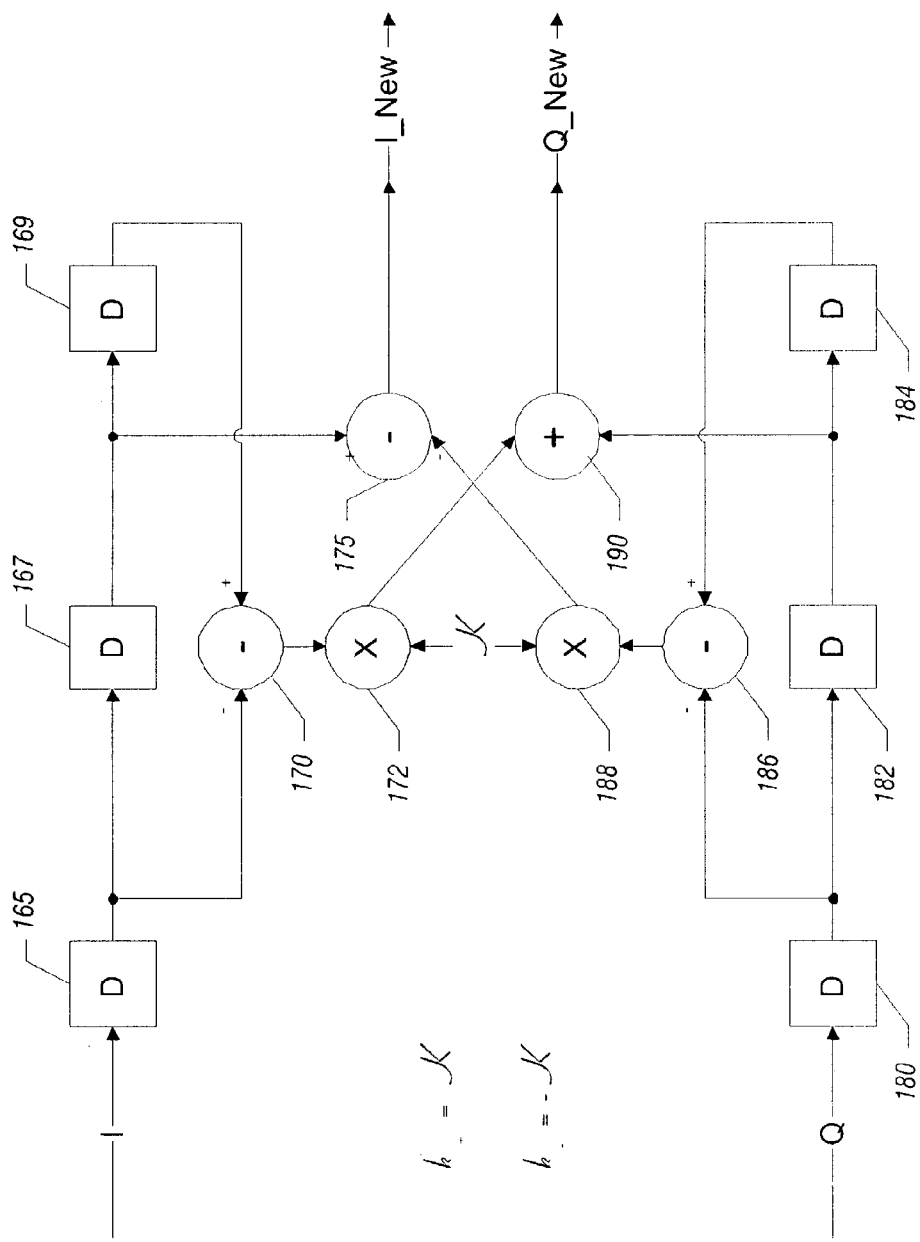
FIG. 3 is a block diagram of a compensation filter for magnitude only correction in accordance with one embodiment of the present invention.

In this case, the CF structure may be reduced, as shown in FIG. 3. Referring now to FIG. 3, shown is a filter structure for a magnitude only correction in accordance with one embodiment of the present invention. As shown in FIG. 3, the complex filter may receive the I signal at a sampling delay 165, which is coupled to a sampling delay 167 and a sampling delay 169. The outputs of the sampling delays 165 and 169 are subtracted in summing block 170. The output of summing block 170 is multiplied in multiplier 172 with the coefficient K.

As shown further in FIG. 3, the Q signal may be provided to a first sampling delay 180, which is coupled to a second sampling delay 182 which is in turn coupled to a third sampling delay 184. The output of sampling delay 180 is subtracted from the output of sampling delay 184 in summing block 186. The output of summing block 186 is multiplied at multiplier 188 with the coefficient K.

As shown in FIG. 3, the output of multiplier 188 is subtracted from the output of sampling delay 167 at summing block 175 and exits the complex filter as the compensated I signal (I_New). Similarly, the output of the multiplier 172 is combined with the output of sampling delay 182 in summing block 190, the output of which is the compensated Q signal (Q_New).

In another embodiment, a digital filter may accommodate fixed point numbers. In such an embodiment, the maximum swing in amplitude may be equal to ±2K and may be reached for a frequency of F=±π/2. In an embodiment in which the sampling rate of the Nyquist filters is Fs=4Fsym, the peaks are reached at ±Fsym. Thus, in the Nyquist bandwidth of interest, with a bandwidth BW=1.25×Fsym, the swing is 2.5×K. From measurements, the maximum correction needed in one embodiment may be approximately 1.5 decibels (dB) (1.2 linear), therefore the maximum value of K may equal plus or minus 0.2, since 20Log(1+K)²=1.5. For example, if K is represented in a signed notation with 11 bits (i.e., S0.10, that is, 1 sign bit, 10 fractional bits, and no integer part bits), then the finest correction may be 0.0085 dB in such an embodiment.

Figure 4:
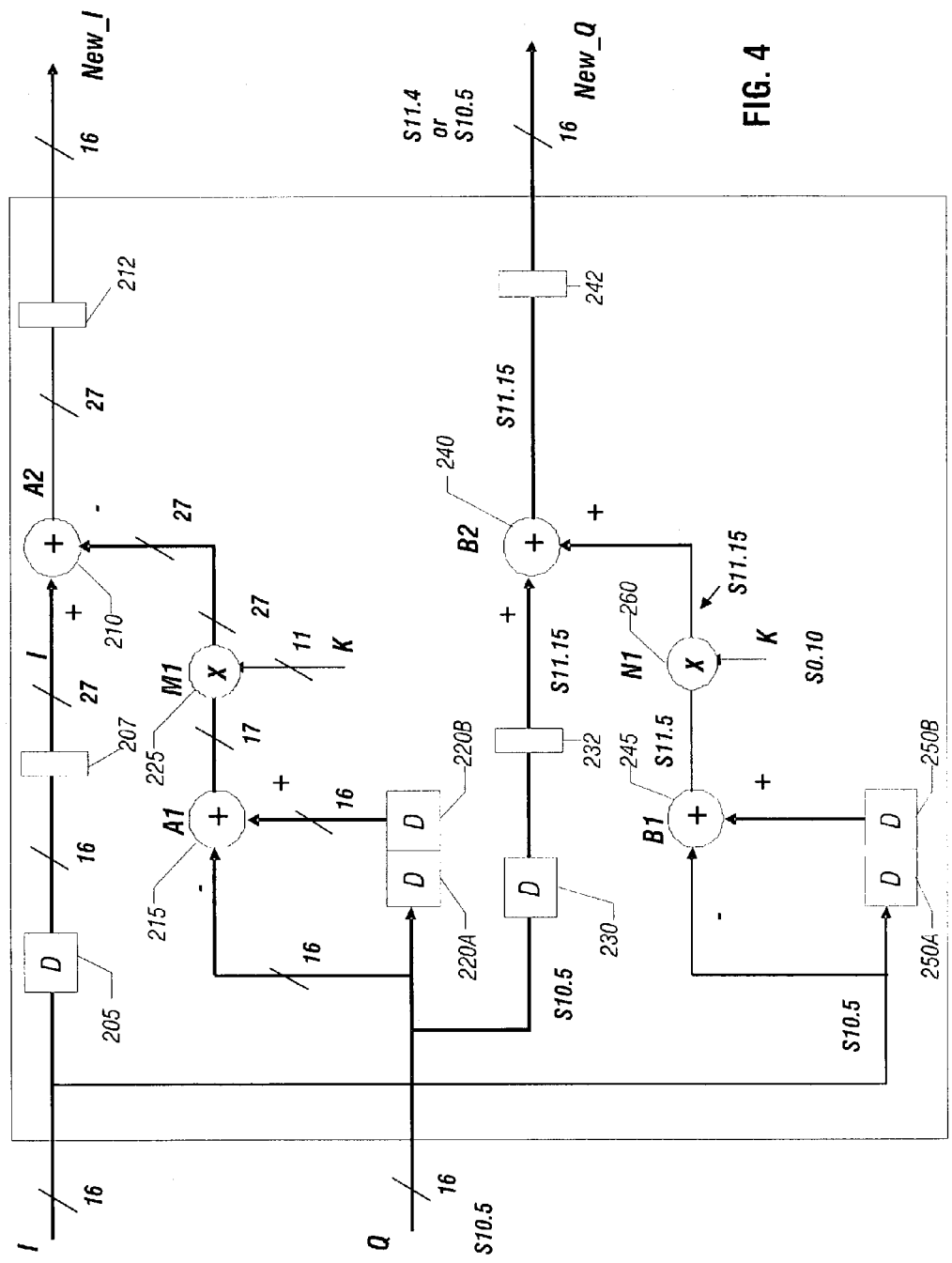
FIG. 4 is a block diagram of a filter structure in accordance with another embodiment of the present invention.

Referring now to FIG. 4, shown is a block diagram of a complex filter structure in accordance with another embodiment of the present invention. As shown in FIG. 4, this filter may be a fixed-point filter and may accommodate signals in fixed-point notation. In the embodiment shown in FIG. 4, the input and output data paths are 16 bits and the coefficient K is represented as an 11-bit signed fractional number in S0.10.

As shown in FIG. 4, the I signal may be input to a sampling delay 205 which then provides it to an expander 207 which, in the embodiment of FIG. 4 expands the signal to 27 bits (for example, in S11.15 format). In one embodiment, expander 207 may be a shift register, for example. The I signal is also provided to sampling delays 250A and 250B and summing block 245. In the embodiment shown in FIG. 4, the incoming I signal may be a 16-bit signed fractional number in S10.5. Similarly, the Q signal input to the fixed point filter may also be a 16-bit signed fractional number in S10.5.

As shown in FIG. 4, the Q signal may be provided to sampling delays 220A and 220B, summing block 215 and sampling delay 230. The sum of summing block 215 (in S11.15 format) is then multiplied in multiplier 225 with coefficient K (also in S11.15 format), the product of which is then added in summing block 210. The sum of summing block 210 (in S11.15 format) is rounded in converter 212 to a 16-bit output, which is the compensated I signal (New_I). In the embodiment of FIG. 4, the compensated I signal may be output in two windows, one window being in S11.4 format and the second window in S10.5 format.

Now following the lower branch (New_Q) of FIG. 4, the delayed Q signal from sampling delay 230 is expanded in expander 232 to a 27-bit signed fractional number in S11.15. This number is summed in summing block 240 with a product of multiplier 260 (obtained by multiplying coefficient K with the sum of summing block 245). The sum of summing block 240 is then rounded in converter 242 and is output in two windows in S11.4 and S10.5 formats as the compensated Q signal (New_Q).

Figure 5C:
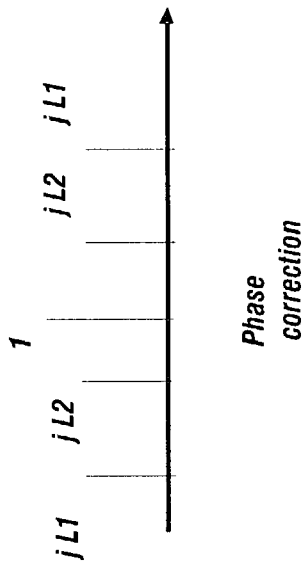
FIG. 5C is an impulse response for the digital filter arrangement of FIG. 5A.
Figure 5B:
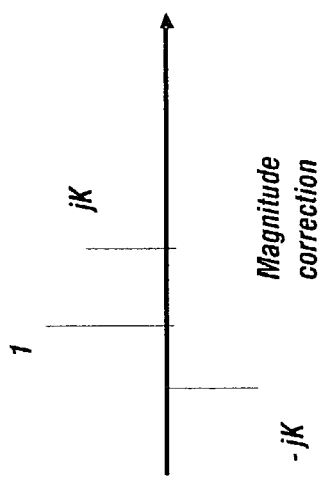
FIG. 5B is an impulse response for the digital filter arrangement of FIG. 5A.
Figure 5A:
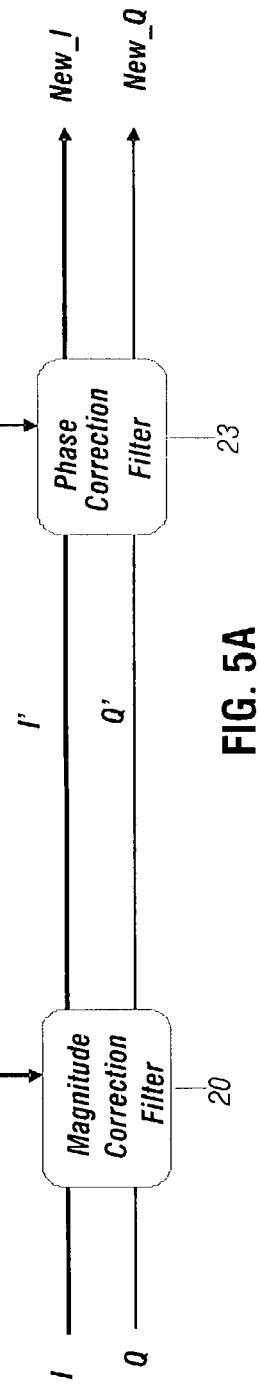
FIG. 5A is a block diagram of a digital filter arrangement in accordance with another embodiment of the present invention.

In another embodiment phase non-linearity of an upstream signal may be corrected in addition to magnitude correction. Referring now to FIG. 5A, shown is a block diagram of a filter structure in accordance with yet another embodiment of the present invention. As shown in FIG. 5A, a magnitude correction filter 20 and a phase correction filter 23 may be placed in cascade with each other. While not shown in FIG. 5A, in various embodiments magnitude correction filter 20 may be coupled to receive outputs of one or more Nyquist filters and phase correction filter 23 may be coupled to provide compensated I and Q signals to one or more interpolator filters.

In one embodiment, magnitude correction filter 20 may be a 3-tap filter corresponding to filter 20 shown in FIG. 2A. The impulse response for this filter is shown in FIGS. 5B and 5C (for magnitude and phase, respectively), with the X-axis representing discrete time. In this embodiment, phase correction filter 23 may be a FIR filter similar to one of the filters discussed above. In such an embodiment, phase correction filter 23 may be a 5-tap filter having two parameters (L1, L2), with taps C(0) to C(4) as shown in FIG. 5A. In certain embodiments, the values of L1 and L2 may be in the range of approximately −0.1 to 0.1. In one embodiment, L1 may be 0.05 and L2 may be 0.01, for example. The magnitude response of such a phase correction filter 23 may be almost unity in the frequency range of interest, and may have a phase response with a parabolic shape around the frequency origin. With the correct choice of parameters L1 and L2, any group delay correction may be added. However, in certain embodiments, only one parameter may be used (i.e., a 3-tap filter with a single parameter L).

Figure 6:
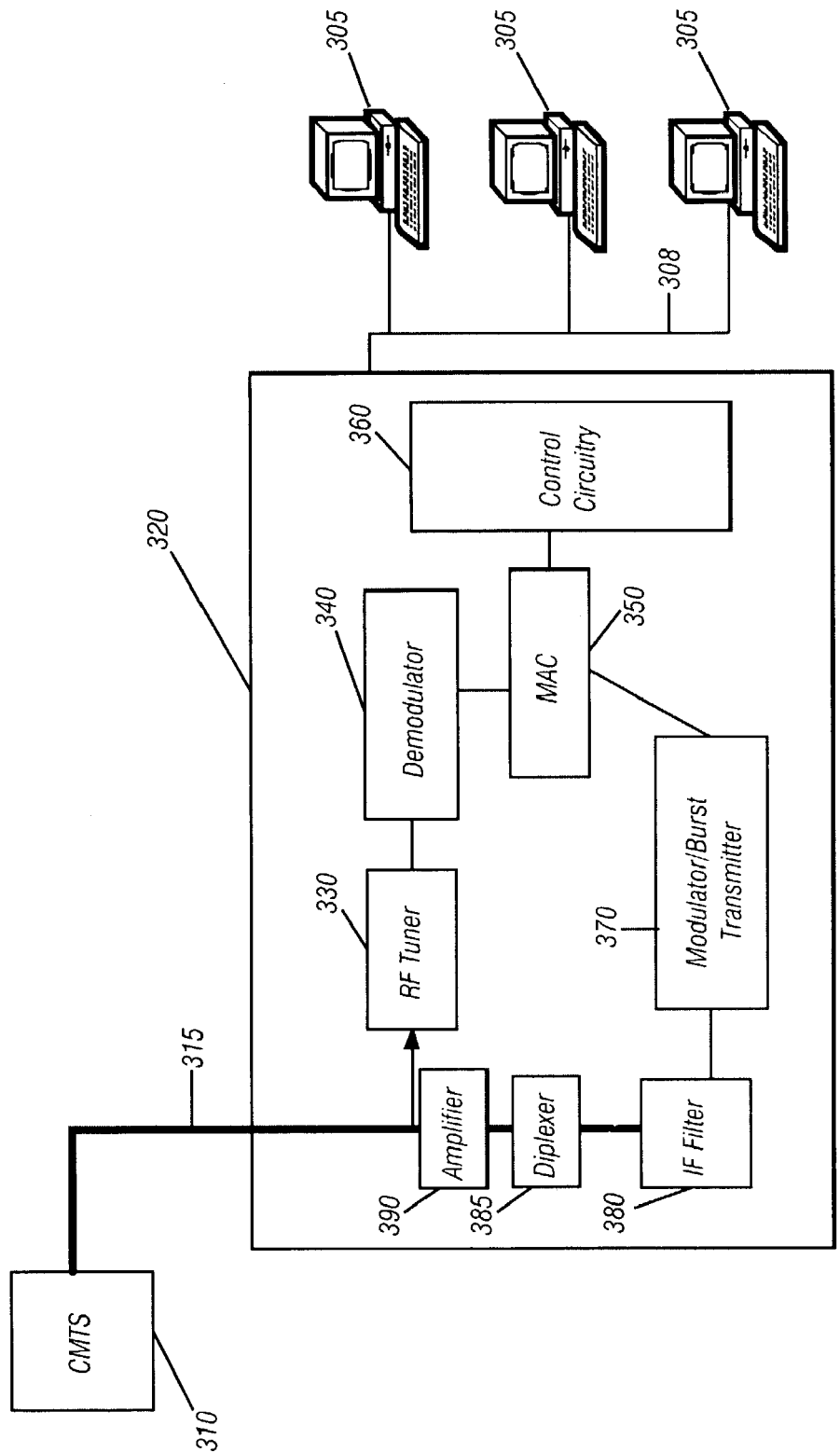
FIG. 6 is a block diagram of a system in accordance with one embodiment of the present invention.

Referring now to FIG. 6, shown is a block diagram of a system in accordance with one embodiment of the present invention. As shown in FIG. 6, a system in accordance with this embodiment may include a CMTS 310 which is coupled to a cable modem 320 via cable 315. In turn, cable modem 320 may be coupled to a plurality of personal computers 305 via a local-area network connection 308. In other embodiments cable modem 320 may be coupled to a single personal computer or other data processing system.

In one embodiment, cable modem 320 may receive downstream data from CMTS 310 via RF tuner 330. The tuned signal may then be demodulated using demodulator 340. Demodulated signals may then be provided to media access control (MAC) 350, which may implement desired protocols for data transfer. In one embodiment, the MAC 350 may be controlled via control circuitry 360.

In one embodiment, an upstream signal path may travel from MAC 350 to modulator/burst transmitter 370. In one embodiment, modulator/burst transmitter 370 may include one or more digital complex filters in accordance with an embodiment of the present invention. The RF signals output from modulator/burst transmitter 370 may be filtered via IF filter 380 and transmitted upstream through a diplexer 385 and an amplifier 390.

In certain embodiments, the present invention may eliminate the need for external components to appropriately correct for magnitude and phase distortions, thus reducing the cost and complexity of a modem. Further, by using one or more programmable digital filters in accordance with an embodiment of the present invention, better correction may be tailored in both magnitude and phase independently. This flexibility may be desirable since different external components, such as a tuner or the like, may be used in various modems.

Certain embodiments may be implemented in software. As such, these embodiments may be stored on a storage medium having stored thereon instructions which can be used to program a data processing device, such as a computer system, modem, receiver, wireless interface or the like, to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as flash memories, read-only memories (ROMs), random access memories (RAMs), erasable programmable read-only memories (EPROMs), electrically erasable programmable read-only memories (FEPROMs), magnetic or optical cards, or any type of media suitable for storing electronic instructions. Similarly, embodiments may be implemented as software modules executed by a programmable control device. A programmable control device may be a processor or a custom designed state machine, for example.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a digital filter to compensate a baseband signal for linear distortion occurring in at least a portion of a passband signal formed from the baseband signal, the digital filter comprising a cascaded magnitude and phase finite impulse response compensation filter comprising a central tap coefficient of one, and a first and last coefficient being pure imaginary, wherein the cascaded magnitude and phase finite impulse response compensation filter comprises a magnitude correction filter having an output coupled to a phase correction filter;
a Nyquist filter to provide an input to the magnitude correction filter; and
an interpolator filter coupled to an output of the phase correction filter.

2. The apparatus of claim 1, wherein the passband signal is to be output from a modem including the digital filter.

3. An apparatus comprising:
a digital filter to compensate a baseband signal for linear distortion occurring in at least a portion of a passband signal formed from the baseband signal, the digital filter comprising a magnitude finite impulse response compensation filter comprising a central tap coefficient of one, and first and last coefficients being pure imaginary and mutually opposite, wherein the first and last coefficients are determined according to:

$$\frac{N^2 \cdot B \cdot SR^2 \pm N \cdot A \cdot SR}{4\pi},$$

where N equals a constant, B equals a group delay, SR equals a symbol rate, and A equals a frequency response magnitude slope.

4. The apparatus of claim 3, further comprising a shaping filter coupled to the digital filter.

5. The apparatus of claim 4, wherein the digital filter is to operate at a rate of the shaping filter.

6. The apparatus of claim 3, wherein the passband signal is to be output from a modem including the digital filter.

7. A method comprising:
pre-equalizing a baseband signal for distortion occurring in at least a portion of a transmitter analog signal path using a digital compensation filter comprising a finite impulse response filter having imaginary first and last coefficients and a real middle coefficient, wherein the first and last coefficients are determined according to:

$$\frac{N^2 \cdot B \cdot SR^2 \pm N \cdot A \cdot SR}{4\pi},$$

where N equals a constant, B equals a group delay, SR equals a symbol rate, and A equals a frequency response magnitude slope.

8. The method of claim 7, wherein the distortion comprises linear distortion in an upstream signal path of a modem.

9. The method of claim 7, wherein the pre-equalizing comprises introducing a frequency response tilt around a carrier frequency of a radio frequency (RF) signal generated in the transmitter analog signal path from the baseband signal.

10. The method of claim 7, wherein the transmitter analog signal path comprises a cable modem upstream path.

11. The method of claim 10, further comprising transmitting a compensated radio frequency signal to a cable modem termination system.

12. An apparatus comprising:
a first digital complex filter to compensate for distortion in at least a portion of a passband signal, the fast digital complex filter located in an upstream signal path of a transmitter; and
a second digital complex filter coupled to the first digital complex filter to compensate for phrase distortion in the passband signal; and
at least one interpolator coupled to an output of the second digital complex filter and a digital up-converter coupled to an output of the at least one interpolator.

13. The apparatus of claim 12, further comprising a digital to analog converter coupled to the digital up-converter and a low-pass filter coupled to the digital to analog converter.

14. The apparatus of claim 12, further comprising at least one shaping filter coupled to the first digital complex filter.

15. The apparatus of claim 12, wherein the transmitter comprises a cable modem.

16. A system comprising:
a first digital complex filter to compensate for distortion in at least a portion of a passband signal, the first digital complex filter located in an upstream signal path of a transmitter the first digital complex filter including;
a plurality of serially connected first delay elements to receive a real portion of the passband signal;
a first summer to subtract an output of a first one of the first delay elements from an output of a last one of the first delay elements; and
a first multiplier to multiply the output of the first summer with a first coefficient, wherein the output of the first multiplier is combined with an imaginary portion of the passband signal to obtain an imaginary portion of a compensated baseband signal; and
a media access control coupled to an output of the first digital complex filter.

17. The system of claim 16, further comprising a second digital complex filter coupled to an output of the first digital complex filter to compensate for phase distortion in the passband signal.

18. The system of claim 16, wherein the transmitter comprises a cable modem.

19. The system of claim 18, further comprising a bus coupled between the cable modem and a computer system.

20. The system of claim 16, further comprising at least one shaping filter coupled to the first digital complex filter.

21. The system of claim 16, further comprising a demodulator coupled to the media access control.

* * * * *

UNITED STATES PATENT AND TRADEMARK OFFICE
CERTIFICATE OF CORRECTION

PATENT NO. : 7,333,558 B2 Page 1 of 1
APPLICATION NO. : 10/403576
DATED : February 19, 2008
INVENTOR(S) : Elias J. Nemer et al.

It is certified that error appears in the above-identified patent and that said Letters Patent is hereby corrected as shown below:

Column 7:
Line 36, "fast" should be --first--.

Column 8:
Line 15, ";" should be --:--.

Signed and Sealed this

Twenty-seventh Day of May, 2008

JON W. DUDAS
*Director of the United States Patent and Trademark Office*